*S. Raymond,*
*Hay Fork.*
No. 36915. Patented. Nov. 11. 1862.
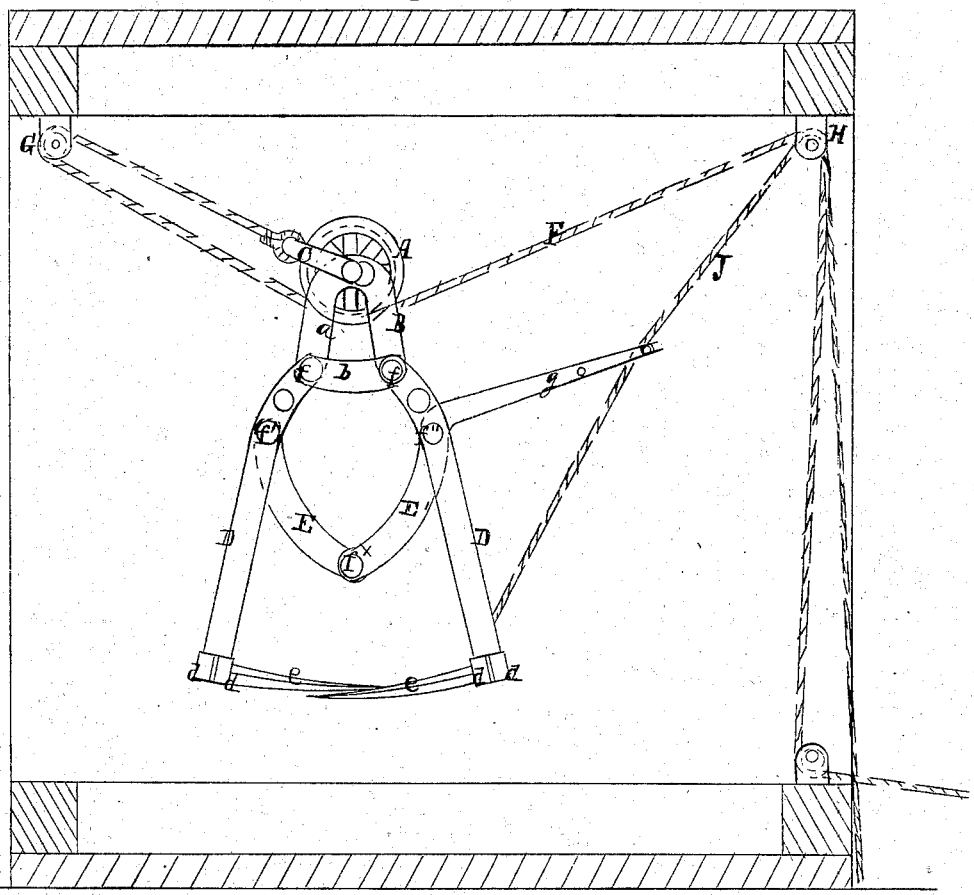
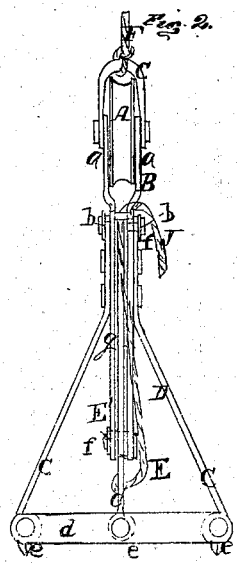
WITNESSES
J.W. Coombs
G.W. Reed
INVENTOR
Squire Raymond
by Munn & Co.
attys

UNITED STATES PATENT OFFICE.

SQUIRE RAYMOND, OF VENICE, NEW YORK.

IMPROVEMENT IN HORSE-PITCHFORKS.

Specification forming part of Letters Patent No. 36,915, dated November 11, 1862.

*To all whom it may concern:*

Be it known that I, SQUIRE RAYMOND, of Venice, in the county of Cayuga and State of New York, have invented a new and Improved Horse-Pitchfork; and I do hereby declare that the following is a full, clear, and exact description of the same, reference being had to the accompanying drawings, making a part of this specification, in which—

Figure 1 is a side view of my invention; Fig. 2, an end view of the same.

Similar letters of reference indicate corresponding parts in the two figures.

This invention relates to a new and improved device for elevating hay, straw, and other substances into lofts or mows by the aid of a horse, and is designed to supersede the ordinary hand-pitchfork originally used for that purpose, and also to supersede those hitherto devised to be operated by a horse.

To this end the invention consists in attaching by joints two fork-arms to a pulley-frame, and connecting the fork-arms by levers, all arranged in such a manner that the hay or other substance to be elevated may be raised with the greatest facility over or to the desired spot, and then discharged from the forks by a very simple manipulation of the operator.

To enable those skilled in the art to fully understand and construct my invention, I will proceed to describe it.

A represents a pulley, which is fitted in a frame, B, having a loop or eye, C, pivoted to its upper end. This frame and pulley may be of cast-iron, and the frame composed of two inverted-U-shaped side pieces, $a\ a$, connected at their lower ends by bars or strips $b\ b$.

D D represent two fork-arms, composed each of three iron bars, $c\ c\ c$, arranged in V form, as shown in Fig. 2, and connected at their lower ends to cross-bars $d\ d$, in which teeth $e$ are secured at right angles, said teeth being slightly curved, as shown in Fig. 1. The upper ends of the fork-arms D D are secured to opposite ends of the pulley-frame B by joints $f$, to admit of said arms swinging toward and from each other. By having the fork-arms D D made of V form, as shown and described, heads $d\ d$ of sufficient length are obtained to receive a requisite number of teeth, $e$, or to have the forks of a proper length.

To one of the fork-arms D there is attached by a pivot or joint, $f$, a curved arm or lever, E, and to the other fork-arm a lever, E', of similar shape or form, is attached by a pivot, $f'$, but is provided with an extension, $g$, which projects out beyond its fork-arm, as shown clearly in Fig. 1. The inner ends of the arms or levers E E' are connected by a pivot, $f^\times$.

To the loop or eye C one end of a rope, F, is attached. This rope passes over a pulley, G, in the upper part of one side of the barn or building in which the hay or other substance is to be elevated and deposited. The rope F also passes underneath the pulley A, and over a pulley, H, at the opposite side of the barn or building, and passes downward and underneath a pulley, I, at the lower part of the building, and has the draft-animal attached to it. (See Fig. 1.)

J is a cord, one end of which is attached to the lower part of the fork-arm D, that has the lever E' fitted in it. This cord J passes through an eye at the outer part of the extension $g$ of the arm or lever E', said cord also passing over a pulley which is by the side of the pulley H.

The operation is as follows: The two fork-arms D D are distended and placed in the substance to be elevated, and then closed, so as to firmly grasp it. The draft-animal is then started, and the device, with its load, is elevated to or over the spot where the load is to be deposited. The operator then pulls the cord J, which actuates the arms or levers E E', and spreads or distends the fork-arms D D, so that the load will be discharged. By this arrangement all catches and springs to hold the fork-arms together are avoided, as the gravity of the load will effect that result, while the arms or levers E E' will cause the fork-arms D D to be distended, so as to discharge the load with a very slight effort on the part of the attendant or operator. In lowering the device it is guided to the proper spot to be reloaded by a slight manipulation of the cord J.

Having thus described my invention, what I claim as new, and desire to secure by Letters Patent, is—

The fork-arms D D, attached by pivots or joints to the pulley-frame B, in combination with the arms or levers E E', secured in the fork-arms D D by pivots $f'$ $f''$, and connected at their inner ends by a pivot, $f^\times$, the lever E' being provided with an extension, $g$, and all used in connection with the rope F and cord J, arranged as and for the purpose set forth.

SQUIRE RAYMOND.

Witnesses:
 NORMAN LESTER,
 CORYDON CONGDON,
 GEORGE N. RAYMOND.